United States Patent
Cierny et al.

(10) Patent No.: US 10,425,966 B2
(45) Date of Patent: Sep. 24, 2019

(54) METHOD AND APPARATUS FOR IMPROVING A TIME GRANULARITY WHEN DEPLOYING A WIRELESS SYSTEM

(71) Applicant: Nokia Solutions and Networks Oy, Espoo (FI)

(72) Inventors: Michal Cierny, Helsinki (FI); Kari Juhani Hooli, Oulu (FI); Timo Lunttila, Espoo (FI); Esa Tapani Tiirola, Kempele (FI)

(73) Assignee: Nokia Solutions and Networks Oy, Espoo (FI)

( * ) Notice: Subject to any disclaimer, the term of this patent is extended or adjusted under 35 U.S.C. 154(b) by 166 days.

(21) Appl. No.: 15/524,399

(22) PCT Filed: Oct. 27, 2015

(86) PCT No.: PCT/EP2015/074805
§ 371 (c)(1),
(2) Date: May 4, 2017

(87) PCT Pub. No.: WO2016/071148
PCT Pub. Date: May 12, 2016

(65) Prior Publication Data
US 2018/0288801 A1 Oct. 4, 2018

Related U.S. Application Data

(60) Provisional application No. 62/076,274, filed on Nov. 6, 2014.

(51) Int. Cl.
*H04W 74/08* (2009.01)
*H04L 5/00* (2006.01)
(Continued)

(52) U.S. Cl.
CPC ......... *H04W 74/0816* (2013.01); *H04L 1/004* (2013.01); *H04L 5/0048* (2013.01);
(Continued)

(58) Field of Classification Search
CPC .. H04W 74/0816; H04W 28/26; H04L 1/004; H04L 5/0048; H04L 27/0008; H04J 13/0062
See application file for complete search history.

(56) References Cited

U.S. PATENT DOCUMENTS

2008/0316961 A1* 12/2008 Bertrand ............. H04W 74/004
370/329
2009/0046672 A1* 2/2009 Malladi ................ H04L 1/0067
370/336
(Continued)

FOREIGN PATENT DOCUMENTS

WO 2016/046607 A1 3/2016

OTHER PUBLICATIONS

Ljubljana, 3GPP TSG RAN WG1 #78bis, "Solutions for required functionalities and design targets", Qualcomm Incorporated; R1-144000; Oct. 6-10, 2014 (Year: 2014).*
(Continued)

*Primary Examiner* — Lan-Huong Truong
(74) *Attorney, Agent, or Firm* — Nokia Technologies Oy

(57) ABSTRACT

A method and apparatus can be configured to determine that a sub-symbol slot is an unoccupied sub-symbol slot. The unoccupied sub-symbol slot corresponds to an unoccupied operating channel. The unoccupied sub-symbol slot is located within the duration of a first symbol. The method may also comprise transmitting a reservation signal in at least one sub-symbol slot between the unoccupied sub-
(Continued)

symbol slot and the beginning of a second symbol. The number of sub-symbol slots within the duration of the first symbol is larger than one.

19 Claims, 12 Drawing Sheets

(51) Int. Cl.
H04L 27/00 (2006.01)
H04L 1/00 (2006.01)
H04W 28/26 (2009.01)
H04J 13/00 (2011.01)

(52) U.S. Cl.
CPC ......... *H04L 27/0008* (2013.01); *H04W 28/26* (2013.01); *H04J 13/0062* (2013.01)

(56) References Cited

U.S. PATENT DOCUMENTS

| | | | |
|---|---|---|---|
| 2013/0070626 A1* | 3/2013 | Gaal | H04W 48/16 370/252 |
| 2013/0142130 A1 | 6/2013 | Wentik | |
| 2013/0315262 A1 | 11/2013 | Baik et al. | |
| 2014/0112289 A1 | 4/2014 | Kim et al. | |
| 2014/0341018 A1* | 11/2014 | Bhushan | H04W 76/15 370/230 |
| 2015/0098349 A1* | 4/2015 | Wei | H04W 16/14 370/252 |
| 2016/0127098 A1* | 5/2016 | Ng | H04L 5/0048 370/329 |

OTHER PUBLICATIONS

"Study on Licensed-Assisted Access using LTE", 3GPP TSG-RAN meeting #65, RP-141646, Agenda: 14.1.1, Ericsson, Sep. 9-12, 2014, pp. 8 Pages.

"Broadband Radio Access Networks (BRAN); 5 GHz high performance RLAN; Harmonized EN covering the essential requirements of article 3.2 of the R&TTE Directive", Draft ETSI EN 301 893, V1.7.2, Jul. 2014, 1-95.

International Search Report and Written Opinion for corresponding Patent Cooperation Treaty Application No. PCT/EP2015/074805 dated Feb. 2, 2016, 13 pages.

Qualcomm Incorporated: "Solutions for required functionalities and design targets", 3GPP Draft; R1-144000 Solutions for Required Functionalities and Design Targets, 3rd Generation Partnership Project (3GPP), Mobile Competence Centre; 650, Route Des Lucioles; F-06921 Sophia-Antipoli vol. RAN WG1, No. Ljubljana, Slovenia; Oct. 6, 2014-Oct. 10, 2014 Sep. 27, 2014 (Sep. 27, 2014), XP050869665.

Interdigital: "Considerations on Cell Search for Evolved UTRA", 3GPP Draft; R1-060850 Cell Search, 3rd Generation Partnership Project (3GPP), Mobile Competence Centre; 650, Route Des Lucioles; F-06921 Sophia-Antipolis Cedex; France, vol. RAN WG1, No. Athens, Greece; Mar. 21, 2006, Mar. 21, 2006 (Mar. 21, 2006), XP050101760.

Qualcomm Incorporated: "Reservation Signal Design for LAA", 3GPP Draft; R1-155729 Reservation Signal Design for LAA, 3rd Generation Partnership Project (3GPP), Mobile Competence Centre; 650, Route Des Lucioles; F-06921 Sophia-Antipolis Cedex; France vol. RAN WG1, No. Malmo, Sweden; Oct. 5, 2015-Oct. 9, 2015 Oct. 4, 2015 (Oct. 4, 2015), XP051002558.

\* cited by examiner

METHOD AND APPARATUS FOR IMPROVING A TIME GRANULARITY WHEN DEPLOYING A WIRELESS SYSTEM

RELATED APPLICATION

This application was originally filed as Patent Cooperation Treaty Application No. PCT/EP2015/074805 filed Oct. 27, 2015 which claims priority benefit to U.S. Provisional Patent Application No. 62/076,274, filed Nov. 6, 2014.

BACKGROUND

Field

Embodiments of the invention relate to improving a time granularity when deploying a synchronized wireless system.

Description of the Related Art

Long-term Evolution (LTE) is a standard for wireless communication that seeks to provide improved speed and capacity for wireless communications by using new modulation/signal processing techniques. The standard was proposed by the 3$^{rd}$ Generation Partnership Project (3GPP), and is based upon previous network technologies. Since its inception, LTE has seen extensive deployment in a wide variety of contexts involving the communication of data.

SUMMARY

According to a first embodiment, a method may comprise determining, by a network element, that a sub-symbol slot is an unoccupied sub-symbol slot. The unoccupied sub-symbol slot corresponds to an unoccupied operating channel. The unoccupied sub-symbol slot is located within the duration of a first symbol. The method may comprise transmitting a reservation signal in at least one sub-symbol slot between the unoccupied sub-symbol slot and the beginning of a second symbol. The number of sub-symbol slots within the duration of the first symbol is larger than one.

In the method of the first embodiment, the sub-symbol slots may comprise clear-channel-assessment slots.

In the method of the first embodiment, the first symbol may comprise either an orthogonal-frequency-division-multiplexing symbol with a cyclic prefix/postfix or a single-carrier frequency-division-multiple-access symbol with a cyclic prefix/postfix.

In the method of the first embodiment, the transmitting may comprise transmitting the reservation signal until a start of transmission of payload data, payload data transmissions may begin only at predefined times, and the predefined times may be at least one of starting times of predetermined symbols, start times of the next symbols, and starting times of the next subframes.

In the method of the first embodiment, with the exception of a first sub-symbol slot, the sub-symbol slots may have equal lengths.

In the method of the first embodiment, the network element may comprise a user equipment.

In the method of the first embodiment, the network element may comprise a base station.

In the method of the first embodiment, the reservation signal may comprise at least a sequence.

In the method of the first embodiment, the sequence may be at least one of a constant-amplitude-zero-autocorrelation sequence and a Zadoff-Chu sequence.

In the method of the first embodiment, the sequence may be determined based on at least one of a Public-Land-Mobile-Network identifier and a physical cell identity.

In the method of the first embodiment, the reservation signal may be mapped to every Nth subcarrier, and N may correspond to a configured or a predetermined number.

In the method of the first embodiment, the reservation signal may be mapped to every Nth subcarrier, and N may correspond to the number of sub-symbol slots within the duration of the first symbol.

In the method of the first embodiment, subcarrier indexes may be determined based on at least one of a Public-Land-Mobile-Network identifier and a physical cell identity.

In the method of the first embodiment, the reservation signal may have a duration of a sub-symbol slot, and the reservation signal may be repeated in a plurality of sub-symbol slots until the beginning of the second symbol.

In the method of the first embodiment, the reservation signal may not be transmitted in a first sub-symbol slot within the symbol.

In the method of the first embodiment, each sub-symbol slot may be long enough to accommodate a clear-channel assessment.

In the method of the first embodiment, the reservation signal may carry at least one of a physical cell identity and a Public-Land-Mobile-Network identifier.

According to a second embodiment, an apparatus may comprise first determining means that determines that a sub-symbol slot is an unoccupied sub-symbol slot. The unoccupied sub-symbol slot may correspond to an unoccupied operating channel, and the unoccupied sub-symbol slot may be located within the duration of a first symbol. The apparatus may also comprise transmitting means that transmits a reservation signal in at least one sub-symbol slot between the unoccupied sub-symbol slot and the beginning of a second symbol. The number of sub-symbol slots within the duration of the first symbol is larger than one.

In the apparatus of the second embodiment, the sub-symbol slots may comprise clear-channel-assessment slots.

In the apparatus of the second embodiment, the first symbol may comprise either an orthogonal-frequency-division-multiplexing symbol with a cyclic prefix/postfix or a single-carrier frequency-division-multiple-access symbol with a cyclic prefix/postfix.

In the apparatus of the second embodiment, the transmitting means may perform transmitting the reservation signal until a start of transmission of payload data, payload data transmissions may begin only at predefined times, and the predefined times may be at least one of starting times of predetermined symbols, starting times of the next symbols, and starting times of the next subframes.

In the apparatus of the second embodiment, with the exception of a first sub-symbol slot, the sub-symbol slots may have equal lengths.

In the apparatus of the second embodiment, the apparatus may comprise a user equipment.

In the apparatus of the second embodiment, the apparatus may comprise a base station.

In the apparatus of the second embodiment, the reservation signal may comprise at least a sequence.

In the apparatus of the second embodiment, the sequence may be at least one of a constant-amplitude-zero-autocorrelation sequence and a Zadoff-Chu sequence.

In the apparatus of the second embodiment, the sequence may be determined based on at least one of a Public-Land-Mobile-Network identifier and a physical cell identity.

In the apparatus of the second embodiment, the reservation signal may be mapped to every Nth subcarrier, and N corresponds to a configured or a predetermined number.

In the apparatus of the second embodiment, the reservation signal may be mapped to every Nth subcarrier, and N may correspond to the number of sub-symbol slots within the duration of the first symbol.

In the apparatus of the second embodiment, the apparatus may further comprise a second determining means that determines subcarrier indexes based on at least one of a Public-Land-Mobile-Network identifier and a physical cell identity.

In the apparatus of the second embodiment, the reservation signal may have a duration of a sub-symbol slot, and the reservation signal may be repeated in a plurality of sub-symbol slots until the beginning of the second symbol.

In the apparatus of the second embodiment, the transmitting means may not transmit the reservation signal in a first sub-symbol slot within the symbol.

In the apparatus of the second embodiment, each sub-symbol slot may be long enough to accommodate a clear-channel assessment.

In the apparatus of the second embodiment, the reservation signal may carry at least one of a physical cell identity and a Public-Land-Mobile-Network identifier.

According to a third embodiment, a computer program product may be embodied on a non-transitory computer readable medium. The computer program product may be configured to control a processor to perform a method according to the first embodiment.

According to a fourth embodiment, a method may comprise receiving, by a network element, a reservation signal. The reservation signal may be in at least one sub-symbol slot between an unoccupied sub-symbol slot and the beginning of a symbol.

In the method of the fourth embodiment, the network element may comprise a user equipment.

In the method of the fourth embodiment, the network element may comprise a base station.

In the method of the fourth embodiment, the reservation signal may carry at least one of a physical cell identity and a Public-Land-Mobile-Network identifier.

In the method of the fourth embodiment, the method may further comprise detecting at least one of a scheduling policy and an occupancy time, based on the received reservation signal.

In the method of the fourth embodiment, the method may further comprise applying at least one of the scheduling policy and the occupancy time.

In the method of the fourth embodiment, the applying may save battery power of the network element.

According to fifth embodiment, an apparatus may comprise a receiving means that receives a reservation signal. The reservation signal may be in at least one sub-symbol slot between an unoccupied sub-symbol slot and the beginning of a symbol.

In the apparatus of the fifth embodiment, the apparatus may comprise a user equipment.

In the apparatus of the fifth embodiment, the apparatus may comprise a base station.

In the apparatus of the fifth embodiment, the reservation signal may carry at least one of a physical cell identity and a Public-Land-Mobile-Network identifier.

In the apparatus of the fifth embodiment, the apparatus may further comprise a detecting means that detects at least one of a scheduling policy and an occupancy time, based on the received reservation signal.

In the apparatus of the fifth embodiment, the apparatus may further comprise an applying unit that applies at least one of the scheduling policy and the occupancy time.

In the apparatus of the fifth embodiment, the applying may save battery power of the apparatus.

According to a sixth embodiment, a computer program product may be embodied on a non-transitory computer readable medium. The computer program product may be configured to control a processor to perform a method according to the fourth embodiment.

According to a seventh embodiment, an apparatus may comprise at least one processor and at least one memory including computer program code. The at least one memory and the computer program code may be configured, with the at least one processor, to cause the apparatus at least to determine that a sub-symbol slot is an unoccupied sub-symbol slot. The unoccupied sub-symbol slot corresponds to an unoccupied operating channel. The unoccupied sub-symbol slot is located within the duration of a first symbol. The apparatus may also be caused to transmit a reservation signal in at least one sub-symbol slot between the unoccupied sub-symbol slot and the beginning of a second symbol. The number of sub-symbol slots within the duration of the first symbol is larger than one.

According to an eighth embodiment, an apparatus may comprise at least one processor and at least one memory including computer program code. The at least one memory and the computer program code may be configured, with the at least one processor, to cause the apparatus at least to receive a reservation signal. The reservation signal is in at least one sub-symbol slot between an unoccupied sub-symbol slot and the beginning of a symbol. The apparatus may also be caused to detect at least one of a scheduling policy and an occupancy time, based on the received reservation signal.

According to a ninth embodiment, a system may comprise a first apparatus. The first apparatus may comprise a first determining means that determines that a sub-symbol slot is an unoccupied sub-symbol slot. The unoccupied sub-symbol slot may correspond to an unoccupied operating channel. The unoccupied sub-symbol slot may be located within the duration of a first symbol. The first apparatus may also comprise transmitting means that transmits a reservation signal in at least one sub-symbol slot between the unoccupied sub-symbol slot and the beginning of a second symbol. The number of sub-symbol slots within the duration of the first symbol may be larger than one. The system may also comprise a second apparatus. The second apparatus may comprise a receiving means that receives the reservation signal. The second apparatus may also comprise detecting means that detects at least one of a scheduling policy and an occupancy time, based on the received reservation signal.

BRIEF DESCRIPTION OF THE DRAWINGS

For proper understanding of the invention, reference should be made to the accompanying drawings, wherein.

DETAILED DESCRIPTION

Figure 1:
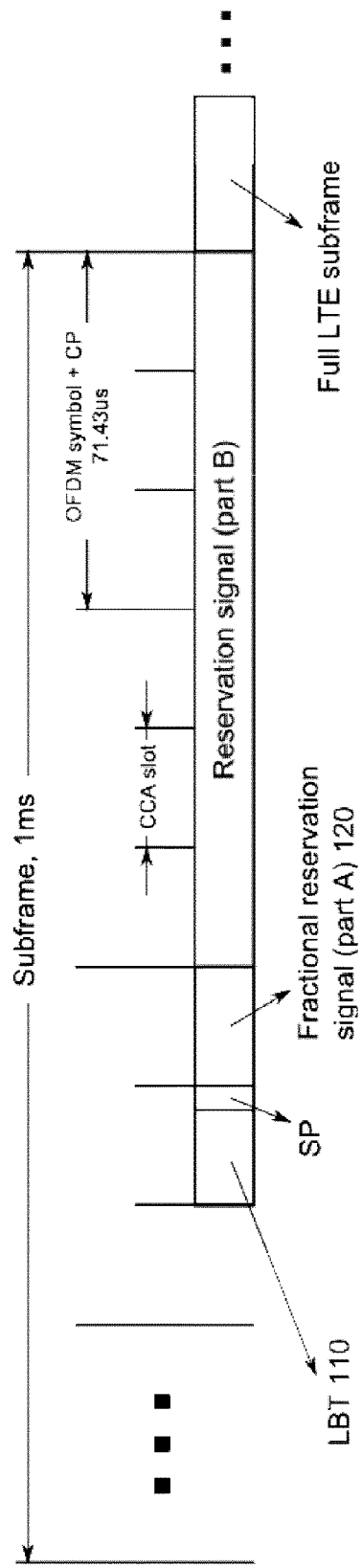
FIG. 1 illustrates an example of dividing a period into sub-symbol slots in accordance with certain embodiments of the present invention.

Certain embodiments of the present invention relate to improving a time granularity when deploying a wireless system. Certain embodiments of the present invention may relate to LTE-Advanced systems, which 3GPP is studying in LTE Release 13. Certain embodiments of the present invention may be directed to LTE operation on an unlicensed spectrum (LTE-U), and such operation may be referred to as a Licensed-Assisted Access (LAA). More specifically, embodiments of the present invention may be directed to an implementation of a specific reservation signal which may be used in the following scenarios. In one scenario, the implementation of the reservation signal may be used in the event that a time granularity of a Listen-Before-Talk (LBT) procedure is to be made smaller than a duration of an LTE symbol. In another possible scenario, the implementation of the reservation signal may be used in the event that a sensing node seeks to start transmission on a channel (as soon as possible) after the channel is determined to be free. The channel may be determined to be free via the application of a Listen-Before-Talk (LBT) procedure. Certain embodiments of the present invention may determine that the channel is free prior to, for example, the start of a next subframe. In another scenario, the reservation signal may occupy the channel outside of the regular LTE symbol/subframe timing, and the reservation signal may also align the start of the data transmission with the LTE frame timing, subframe timing, and/or symbol timing. Certain embodiments of the present invention may provide the above-described reservation signal in conjunction with an evolutionary LTE LAA system.

In some regions of the world, unlicensed technologies may need to abide by certain regulations, such as, for example, Listen-Before-Talk (LBT) requirements in order to ensure a fair coexistence between LTE and other technologies (such as WLAN, for example). In the future, fair coexistence may possibly be ensured between LTE operators.

For LAA, a global solution that enhances LTE in order to enable a licensed-assisted access to an unlicensed spectrum is needed, while the accessing coexists with other technologies and fulfills the corresponding regulatory requirements of the other technologies. A global solution may mean that the LTE LAA fulfills the combined requirements of all regulatory bodies.

It is preferred that the enhancements reuse the features of LTE as much as possible.

Regarding Listen-Before-Talk (LBT), with LTE Unlicensed (LTE-U) operation, before being permitted to transmit a transmission, a user equipment, an access point, and/or a base station (such as an evolved Node B) may, depending on the regulatory requirements, need to monitor a given radio frequency for a short period of time. The user or the base station may monitor the radio frequency to determine when the transmission can be transmitted. By monitoring the given radio frequency for the short period of time, the user or the base station may ensure that the spectrum is not already occupied by some other transmission. The requirement of monitoring the radio frequency to ensure that the spectrum is not already occupied may be referred to as a Listen-Before-Talk (LBT) requirement. The requirements for LBT may vary depending on the geographic region. The requirements for LBT may also vary depending on the frequency band. For example, in the United States, such requirements do not exist. In Europe and Japan, the network elements that operate on unlicensed bands may need to comply with LBT requirements.

European Telecommunications Standards Institute (ETSI) defines rules for channel access of a 5 GHz unlicensed band. In general, ETSI defines two types of channel-access mechanisms: (1) a mechanism using Frame-based Equipment (FBE), and (2) a mechanism using Load-based Equipment (LBE). LBE is an equipment type where the transmitting/receiving structure is not fixed at all times, but rather is demand-driven. Key aspects of LBE that are based on ETSI regulatory rules may be further described below.

Unlike Frame-Based Equipment (FBE), Load-Based Equipment is not restricted to performing Listen-Before-Talk/Clear-Channel-Assessment (LBT/CCA) according to any certain frame structure. For example, Load-Based Equipment is not restricted to performing LBT/CCA at, fixed, defined times. Instead, LBE may perform LBT (CCA) whenever LBE has data to transmit. Unlike FBE, with LBE, the CCA procedure may be modified after the equipment finds that the channel is occupied, or if the equipment has already transmitted for a maximum time and needs to continue transmission. The key points can be summarized as follows. Before transmitting a transmission or a burst of transmissions on an Operating Channel, the equipment may perform a Clear Channel Assessment (CCA) check using an "energy detect" procedure to determine whether or not the channel is clear. If the equipment finds that the Operating Channel(s) is clear, the equipment may immediately transmit. The total time that an equipment uses an Operating Channel may be referred to as a Maximum Channel Occupancy Time, which may be less than a duration corresponding to $(13/32) \times q$ ms, where $q=\{4 \ldots 32\}$. For example, when q has a value of "32," the Maximum Channel Occupancy Time is 13 ms. If the equipment determines that the Operating Channel is occupied, the equipment will generally not transmit using that channel.

If the equipment determines that the Operating Channel is occupied, the equipment may then perform an Extended CCA check. With the extended CCA check, the Operating Channel(s) is/are observed for a duration of time corresponding to a random factor N multiplied by the CCA observation time. N corresponds to the number of clear idle slots that result in a total Idle Period that may need to be observed before initiation of the transmission. The value of N may be randomly selected in a range $(1 \ldots q)$ every time an Extended CCA is required, and the value may be stored in a counter. The counter may be decremented every time a CCA slot is considered to be "unoccupied." When the counter reaches zero, the equipment may then transmit. An LBE method may maximize channel utilization in the sense that the device can utilize all transmission opportunities, without having to wait for the fixed-frame period.

Certain embodiments of the present invention may be directed to an LTE LAA deployment scenario. The considered LTE LAA deployment scenario may correspond to LTE Carrier aggregation where Secondary cells (Scell(s)), which operate in an unlicensed spectrum, may need to be synchronized with a Primary Cell (Pcell) that operates in a licensed spectrum. Hence, in order to maximize the advantages of existing LTE features and to minimize adverse impacts on transmitter and receiver implementations, while deploying LTE in an unlicensed band, embodiments of the present invention may be directed to using LAA as a system with a frame structure that matches the frame structure of LTE Release 8. As such, embodiments of the present invention may divide a time period/axis into radio frames, subframes, and OFDM symbols that are the same size as the divisions provided by LTE Release 8.

However, if LAA is to operate as LBE so that LAA has a comparable chance to access an unlicensed band as WLAN, LAA should be allowed to start transmissions at any arbitrary time. Because starting transmission at any arbitrary time is in contradiction to the frame approach described above, a reservation signal (such as, for example, a preamble) may be needed to fill the space between LBT (when LBT determines that a channel is unoccupied) and the start of a next full LAA subframe. One purpose of the reservation signal may be to reserve the channel (upon determining that the channel is free via successfully performing LBT) until the start of a next LAA subframe.

In certain embodiments of the present invention, the reservation signal may be divided into two parts. In a first part, part A may fill the space from the time instance of LBT (of determining that the channel is free via LBT) to a following/next full Orthogonal-frequency-division-multiplexing (OFDM) symbol. In a second part, Part B may comprise one or more OFDM symbols. Part A or part B may not be needed, depending on when/where the signal starts, as described in more detail below. The structure of part B may not be complicated from an LTE perspective, because the structure of part B may possibly be implemented in accordance with LTE numerology. Part A, on the other hand, may fill a fraction of an OFDM symbol.

3GPP has generally standardized all signals in a system, and the aforementioned reservation signal should also be standardized. LBT and the reservation signal may have a granularity that is in agreement with ETSI requirements on CCA, which is a minimum of 20 μs or 18 μs (depending on the ETSI specification version) or any other value to be defined. At the same time, the potential granularity of the reservation signal may take into account the time that is needed to switch from Reception (Rx) (LBT) to Transmission (Tx).

Embodiments of the present invention may introduce: (1) CCA (Clear Channel Assessment) slots as an enhancement of LTE numerology for efficient LBT operation, and (2) a reservation signal that reserves the channel from when LBT determines an unoccupied sub-symbol slot (such as a CCA slot, for example) until a second full OFDM symbol (which may be the next or a later OFDM symbol), or until an SC-FDMA symbol, or until some other predefined time instance. A first symbol and the next, second symbol may or may not be adjacent symbols.

According to certain embodiments of the present invention, CCA slots may comprise certain properties. A duration of N (for example, 2 or 3) CCA slots may be the same as M (for example, 1 or 2) times OFDM symbol lengths, including cyclic prefixes or cyclic postfixes (CPs). N CCA slots may form a CCA slot period. A CCA slot may be long enough to comprise a CCA (corresponding to a duration of 20 μs or 18 μs) and also a switching time (a time for transitioning from a Rx state to a Tx state). A duration of each CCA slot (within the same OFDM symbol or same CCA slot period) is preferably the same. However, in certain embodiments, the lengths of the CCA slots may slightly differ.

As described above, in certain embodiments of the present invention, an LAA node that detects a free channel within a CCA slot may subsequently transmit a reservation signal or a reservation signal part A. This reservation signal (or reservation signal part A) may fill remaining CCA slots until the start of a second whole OFDM symbol (which may be the next or a later OFDM symbol), or until another predefined time instance. If there are multiple CCA slots to fill, the reservation signal (or the reservation signal part A) can be implemented in three possible ways. In a first possible implementation, the reservation signal can be implemented as a signal with the length of one CCA slot, and the signal may be repeated multiple times. In a second implementation, multiple signals with multiple lengths may be defined, and the LAA node may pick a signal with an appropriate length. The multiple lengths may relate to a complete/total length of a signal. In a third implementation, the signal may comprise multiple elementary signals of different lengths.

As an example, a signal with a length of one CCA slot may be repeated until the start of a next whole OFDM symbol, followed by one or more repetitions of a signal with a duration equal to a complete OFDM symbol, until the start of the next predefined time instance.

Sub-symbol slots (such as, for example, CCA slots) may introduce a granularity that is finer than the granularity of symbols (for example, OFDM symbols). By using CCA slots, the capability of an LTE LAA that reserves a channel can be improved compared to merely using pure LTE numerology, and these improvements may be achieved while still maintaining a synchronous timing with respect to an LTE PCell that is operating on a licensed band.

Embodiments of the present invention may relate to an evolved Node B operation that comprises the following features. Embodiments of the present invention may define N CCA slots within M OFDM symbols (where the OFDM symbols are associated with corresponding CPs), where the value of N may be greater than the value of M. Embodiments of the present invention may comprise defining/implementing/determining a reservation signal that comprises a Sequence part. The reservation signal may also possibly comprise a CP part. As described above, embodiments of the present invention may comprise a step of observing that an operating channel is unoccupied, and may also comprise performing a step of transmitting a reservation signal in one or more CCA slots until the end of the OFDM symbol.

In certain embodiments of the present invention, the reservation signal may be mapped to every Nth subcarrier (where N corresponds to the number of CCA slots per OFDM-symbol- and CP period). Subcarrier indexes (i.e., transmission combs) may be determined based on at least one of a Public-Land-Mobile-Network identifier (PLMN ID) and a physical cell identity (PCI), or the subcarrier indexes may be predetermined by some other means. The reservation signal may have a duration of one CCA slot, and the reservation signal may be repeated in X CCA slots, where X corresponds to the number of CCA slots from the end of the successful CCA until the end of the present OFDM symbol.

In certain embodiments of the present invention, the reservation signal may have a duration of X CCA slots, where X corresponds to the number of CCA slots from the end of the successful CCA until the end of the present OFDM symbol. In certain embodiments, the value of X may be less than the value of M (i.e., the reservation signal may possibly never be transmitted on a first CCA slot). In certain embodiments, the sequence part of the reservation signal may be a Constant-Amplitude-Zero-Autocorrelation-Waveform (CAZAQ) sequence. The sequence part may have a duration of approximately 18 μs or 20 μs. The root sequence may be determined based on at least one of a PLMN ID and a PCI, for example. The CCA slot may be long enough to accommodate CCA. For example, the CCA slot may have a duration of more than approximately 18 μs or 20 μs. Each CCA slot may have equal length as other CCA slots (with the exception of the first CCA slot, for example).

In certain embodiments of the present invention, a CCA slot may be divided into two parts: (1) a CCA part and (2) a switching part (SP). The CCA part should be long enough to comprise a CCA period that fulfills ETSI requirements (and thus have a duration of at least 20 μs or 18 μs). The SP may facilitate switching from a Rx state to a Tx state. This transition may occur either completely or mostly during the SP. In the latter case, the transition may be completed during the CCA part of the next CCA slot.

In certain embodiments of the present invention, as described above, the duration of each CCA slot may be the same as other CCA slots, for example, at least when the CCA slots are within the same OFDM symbol or within the same CCA slot period. As one exception, the first CCA slot of the CCA slot period may have a different duration as the other CCA slots. In one embodiment of the present invention, a CCA slot duration may be defined to be a multiple of time units used in the definition of the OFDM symbol. To achieve such a defining of the multiple of time units, for different N and M values as defined above, a duration of first CCA slot of the CCA slot period may be varied, while the other CCA slot durations may be equal. In the case of a normal CP length (which may be a scenario for LTE LAA), the first symbol of each LTE slot (where 1 LTE subframe=2 LTE slots) has a slightly longer CP compared to the other symbols of the LTE slot. This may need to be taken into account in the CCA slot design.

In one embodiment of the present invention, a first CCA slot may be defined to be longer than other CCA slots that correspond to the first OFDM symbol. In another embodiment, CCA slots within a CCA slot period corresponding to the first OFDM symbol of the LTE slot are defined to be longer than CCA slots that correspond to the other OFDM symbols of the LTE slot. The LTE slot may refer to an LTE frame structure element with a 0.5 ms duration. In one embodiment, the value of N may be 3, and the value of M may be 1. Different embodiments may also be possible. For example, the duration of a CCA slot may vary based on the CCA slot period, that is, the number of involved (M) OFDM symbol(s).

With respect to examples of CCA-slot numerology, an LTE OFDM symbol with CP may be approximately 70 μs long. Switching from Rx to Tx at an eNB is estimated to last 2 to 5 μs. With such settings, embodiments of the present invention may divide an OFDM-symbol-and-CP period into 3 CCA slots (N=3, M=1).

FIG. 1 illustrates an example of dividing a period into sub-symbol slots in accordance with certain embodiments of the present invention. The sub-symbol slots may be CCA slots. Specifically, FIG. 1 illustrates an example of dividing a period (comprising an OFDM symbol and CP) into 3 CCA slots. In the example of FIG. 1, an LAA node senses a free channel in the "middle" CCA slot (marked by LBT 110). Therefore, the LAA node may fill one remaining CCA slot with a fractional reservation signal (part A) 120. The rest of the reservation signal may span full OFDM symbols and can follow LTE numerology.

Figure 2:
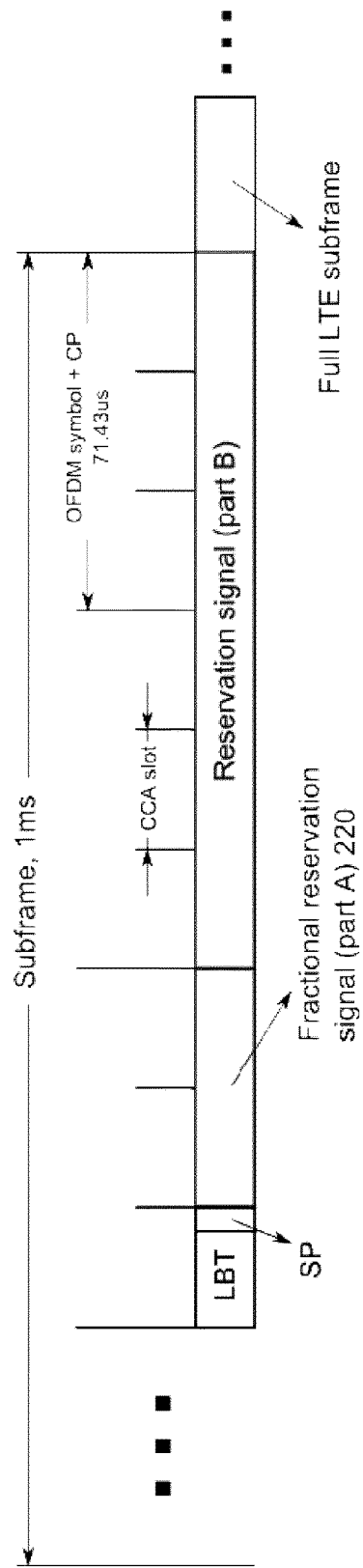
FIG. 2 illustrates another example of dividing a period into sub-symbol slots in accordance with certain embodiments of the present invention.

FIG. 2 illustrates another example of dividing a period into sub-symbol slots in accordance with certain embodiments of the present invention. Specifically, FIG. 2 illustrates another example of dividing an OFDM-symbol-and-CP period into 3 CCA slots. In this example, the LAA node detects a free channel in a CCA slot (which is positioned at the beginning of an OFDM-symbol-and-CP period). Therefore, the LAA may need to fill 2 CCA slots with a fractional reservation signal (part A) 220. This filling may be performed, for example, with a twice-repeated signal (with each signal corresponding to a length of one CCA slot), or the signal may be defined with a length of 2 CCA slots. The remaining part of the reservation signal (part B) may follow LTE numerology.

Figure 3:
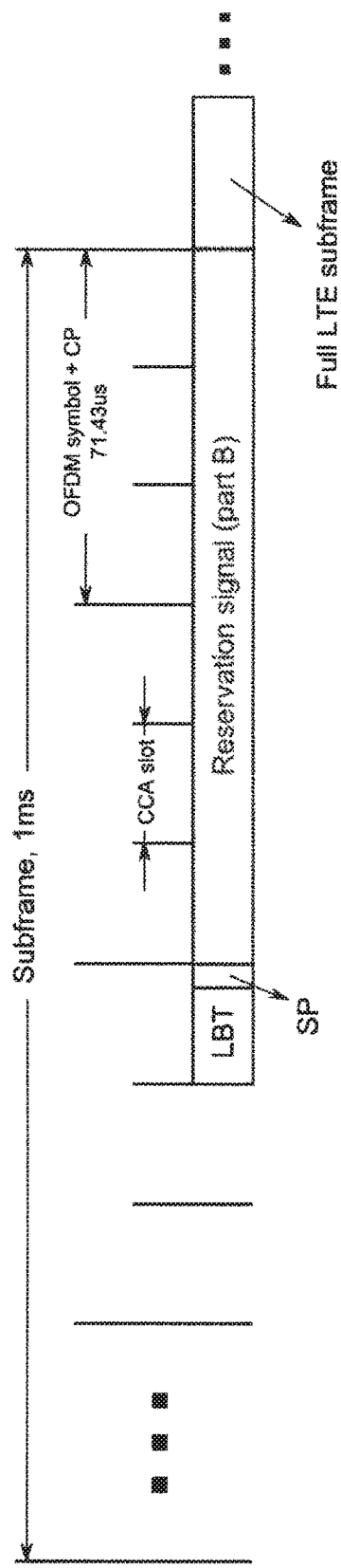
FIG. 3 illustrates another example of dividing a period into sub-symbol slots in accordance with certain embodiments of the present invention.

FIG. 3 illustrates another example of dividing a period into sub-symbol slots in accordance with certain embodiments of the present invention. Specifically, FIG. 3 illustrates another example of dividing an OFDM-symbol-and-CP period into 3 CCA slots. In this example, the LAA node detects a free channel in the last CCA slot of an OFDM-symbol-and-CP period. Therefore, the LAA node does not need any fractional reservation signal (part A). In this case, the whole reservation signal can follow LTE numerology.

Figure 4:
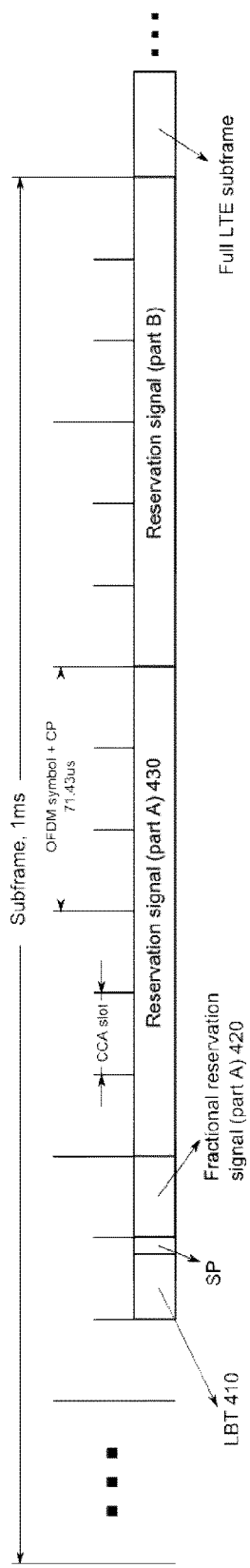
FIG. 4 illustrates another example of dividing a period into sub-symbol slots in accordance with certain embodiments of the present invention.

FIG. 4 illustrates another example of dividing a period into sub-symbol slots in accordance with certain embodiments of the present invention. Specifically, FIG. 4 illustrates another example of dividing an OFDM-symbol-and-CP period into 3 CCA slots. Reservation signal (part B), which carries information, may start at a predefined OFDM symbol, which is at an LTE slot boundary, in this example. In this example, the LAA node detects a free channel corresponding to a CCA slot in the "middle" CCA slot (marked by LBT 410). Therefore, the LAA node may need to fill 1 CCA slot with a fractional reservation signal 420. The remaining part of the reservation signal 430 (of part A) may follow LTE numerology, in a similar manner as part B.

The fractional reservation signal may not be included in the first CCA slot. A complete OFDM symbol that follows LTE numerology may be transmitted in the cases where a reservation signal starts at an OFDM symbol boundary. Embodiments of the present invention may take advantage of this fact, as variations of CCA slot lengths may be concentrated on the first CCA slot. Hence, embodiments of the present invention may reduce the amount of different fractional reservation signal lengths that need to be supported.

With respect to the reservation signal structure, for the fractional reservation signal (part A), one embodiment takes advantage of Constant-Amplitude-Zero-Autocorrelation-Waveform (CAZAC) sequences, such as extended Zadoff-Chu sequences. The fractional reservation signal may be constructed with a flat frequency response and may allow implementation in either the time domain or the frequency domain. The length of a chosen sequence in samples may depend on a system bandwidth (BW). This system bandwidth may be, for example, 5 MHz, 10 MHz, or 20 MHz.

Based on the aforementioned ETSI regulation, the reservation signal may occupy at least 80% of a system BW.

CAZAC sequences may also be good candidates for the reservation signal because these sequences may have constant amplitude and zero autocorrelation properties. A constant amplitude may be advantageous, for example, for correct Automatic-Gain-Control (AGC) settings or Analog-to-Digital (A/D) dynamic range settings at the LAA receiver. In one embodiment of the present invention, the root of the sequence may be determined based on the LAA cell or on the Public-Land-Mobile-Network (PLMN) identity, in which case the zero autocorrelation properties of CAZAC may allow appropriate separation among different cells/PLMNs.

Definitions of the sequences may be based on the sequences for Uplink-Demodulation-Reference-Signal (UL DM RS) in LTE. It may also be possible to utilize Interleaved-Frequency-Division-Multiple-Access (IFDMA) with a predefined Repetition Factor (RPF) and frequency comb, such that part A of the reservation signal occupies every Nth LTE subcarrier (where N corresponds to the number of CCA slots per OFDM-symbol-and-CP period). One base sequence (root) may be used in combination with different cyclic shifts to allow for further degrees of freedom for sequence separation. The selection of root and cyclic shift (the performing of sequence hopping and cyclic-shift hopping, for example) allows for randomization schemes on top of the reservation signals.

The length of applied CAZAC sequences can be defined based on how many sequences are needed because, for example, the number of available Zadoff-Chu sequences corresponds to the number of integers that are relatively prime to the sequence length.

In certain embodiments of the present invention, the reservation signal may fill a CCA slot in different ways. In one option, there may be a reservation sequence and a CP (cyclic prefix or postfix) in each CCA slot. The CP may be CCA-slot specific. This implementation may be utilized, for example, if the reservation signal is to exactly fill every Nth (virtual, in case of Single-Carrier-Frequency-Division-Multiple-Access (SC-TDMA)) LTE subcarrier. In another possibility, the reservation sequence may fill an entire CCA slot (CCA and SP part). This implementation would maximize the sequence length. In the case when there are multiple reservation signals defined with multiple lengths, corresponding to one or multiple CCA slots, the reservation signal may be composed of a single or a repeated sequence and a single CP (cyclic prefix or postfix).

When the reservation signal carries an LAA cell identity or a PLMN identifier, based on a selected sequence root and/or a cyclic shift, another LAA node that detects this sequence may use the knowledge to its advantage. An LAA network of an operator may, for example, use a certain scheduling policy or a (minimum) channel occupancy time. An LAA UE that detects this policy may use the policy, for example, to save the LAA UE's battery by not performing LBT until an occupancy time ends.

In the case when a reservation signal part B starts at predefined OFDM symbols (for example, at an LTE slot boundary), reservation signal part A may comprise a fractional reservation signal (as discussed above) and a number of OFDM symbols. These OFDM symbols may follow LTE numerology and may be generated by using LAA SCell CRS, or LTE UL reference sequences (DM RS or SRS).

With regard to some examples of a reservation-signal structure, a couple of numerical examples for the fractional reservation signal are discussed below. With a first embodiment, the embodiment may support a 20 MHz system BW. With regard to CCA slot definition, an OFDM-symbol-and-CP period may be divided into 3 CCA slots (N=3, M=1). The CCA slot duration may be defined to be a multiple of LTE time units, $T_s=1/(15000 \times 2048)$ seconds. With regard to a sequence definition, time domain samples of a sequence are generated with an Inverse-Discrete-Fourier-Transform (IDFT) of size 731. An IDFT size of 731 can be readily implemented, as 731 is a product of 17 and 43. A first CCA slot may comprise 730 samples, while the other two CCA slots may be 731 samples. In the case of a first OFDM-symbol-and-CP period of an LTE slot, which has larger CP than other OFDM-symbol-and-CP periods in the LTE slot, the first CCA slot is 746 samples. Alternatively, an IDFT size of 729 or 735 may be used. Both have efficient implementation as products of small prime numbers: 729 is a power of 3, and $735=3 \times 5 \times 7 \times 7$. For efficient implementation, it is desirable to have IDFT size as a product of small prime numbers. To facilitate use of such preferable IDFT sizes in the fractional reservation signal generation, a duration of a first CCA slot may be altered to obtain CCA slot duration, corresponding to such preferable IDFT sizes, in the following CCA slots. This approach takes advantage of the fact that fractional reservation signal is not transmitted during the first CCA slot, possibly not corresponding to an IDFT size equal to a product of small prime numbers. Other CCA slots may be defined according to the preferable IDFT size.

In both cases, the subcarriers of IDFT may occupy a 30.72 MHz bandwidth, similar to LTE IFFT. The selected Reservation Sequence may be a Zadoff-Chu sequence. The reservation sequence bandwidth may be selected to be within 80%-90% of a 20 MHz system BW. Further, the sequence length may be a prime number. Hence, a sequence length may be any of {383, 389, 397, 401, 409, 419, 421}. A Zadoff-Chu sequence (or DFT of Zadoff-Chu sequence) may be inserted to an input of IDFT.

With respect to a fractional reservation signal definition, time domain samples of IDFT may be used when the signal fills one CCA slot. In the case of two CCA slots, time domain samples may be repeated. In the case that a reservation signal covers 3 CCA slots, a complete OFDM symbol may be used.

With a second embodiment, the embodiment may support 5 MHz, 10 MHz, and 20 MHz system bandwidths. With respect to a CCA slot definition, an OFDM-symbol-and-CP period may be divided into 3 CCA slots (N=3, M=1). The CCA slot duration may be defined to be a multiple of LTE time units $T_s=1/(15000 \times 2048)$ seconds. With respect to a sequence definition, a sequence may be defined based on a 5 MHz system bandwidth. Time domain samples of a sequence may be generated with an IDFT of size 732. Alternatively, an Inverse-Discrete-Fourier-Transform (IDFT) size of 756 may be used. This may be an efficient implementation, as 756 is a power of 2, 3 and 7. To facilitate different IDFT sizes, duration of a first CCA slot may be altered. Other CCA slots may be defined according to the used IDFT size.

A Zadoff-Chu sequence may be selected. The sequence bandwidth may be selected to be within 80%-90% of a 5 MHz system BW. Further, the sequence length may be decided to be a prime number. Hence, a sequence length may be any of {149, 151, 157, 163} for IDFT of 732, {157, 163, 167} for IDFT of 756. A Zadoff-Chu sequence (or DFT of Zadoff-Chu sequence) may be inserted to an input of IDFT. In the case of a 10 MHz or 20 MHz system bandwidth, the sequence may be inserted on every second or every fourth subcarrier at the central part of IDFT input.

With respect to a fractional reservation signal definition, time domain samples of IDFT may be used when the signal fills one CCA slot. In the case of two CCA slots, time domain samples may be repeated. In the case that a reservation signal covers 3 CCA slots, a complete OFDM symbol may be used.

Certain embodiments of the present invention may relate mostly to base station (for example, eNB) behaviour which reserves a channel until a next full subframe and then transmits a traditional LTE subframe. As mentioned above, another LAA node may detect the reservation signal and may identify PCI or PLMN based on the transmitted sequence. If LAA (at a later stage) allows uplink operation, a UE that identifies PCI or PLMN may deduce scheduling/transmission characteristics of a given cell. This information may be subsequently used to the UE's advantage. For example, the UE could postpone sensing the channel (even if there is data in the buffer) and save battery power.

Figure 5:
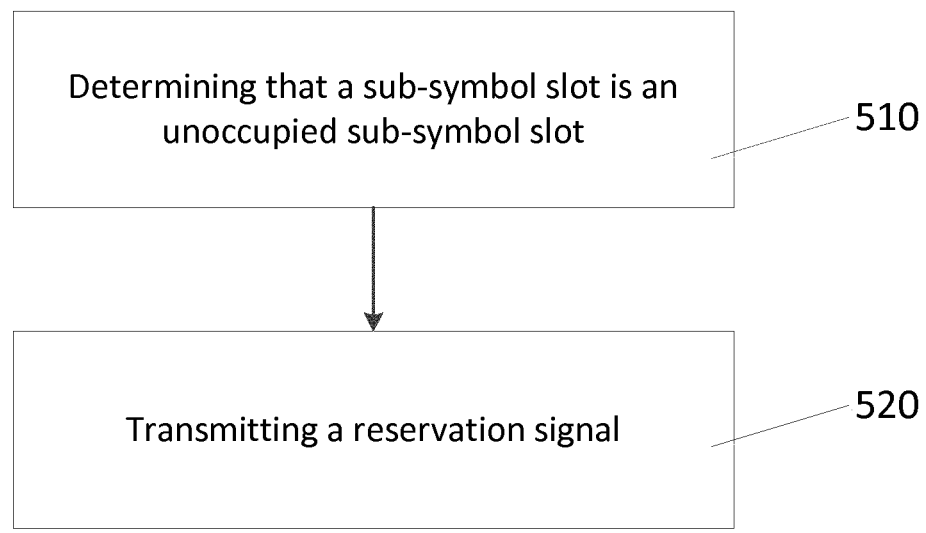
FIG. 5 illustrates a flowchart of a method in accordance with embodiments of the invention.

FIG. 5 illustrates a flowchart of a method in accordance with embodiments of the invention. The method illustrated in FIG. 5 comprises, at 510, determining, by a network element, that a sub-symbol slot is an unoccupied sub-symbol slot. The unoccupied sub-symbol slot may correspond to an unoccupied operating channel. The unoccupied sub-symbol slot may be located within the duration of a first symbol. The method may also comprise, at 520, transmitting a reservation signal in at least one sub-symbol slot between the unoccupied sub-symbol slot and the beginning of a second symbol. The number of sub-symbol slots within the duration of the first symbol may be larger than one.

Figure 6:
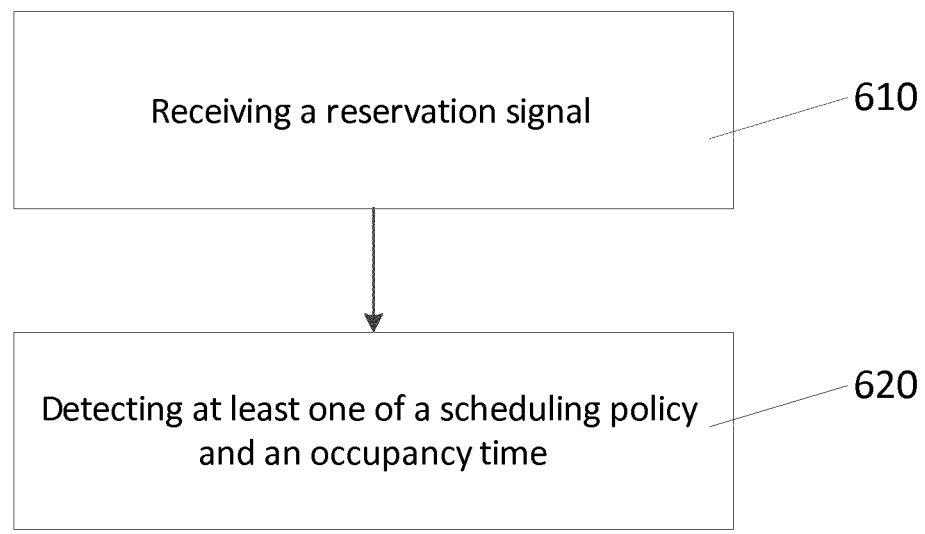
FIG. 6 illustrates a flowchart of another method in accordance with embodiments of the invention.

FIG. 6 illustrates a flowchart of another method in accordance with embodiments of the invention. The method, at 610, comprises receiving a reservation signal. The reservation signal may be in at least one sub-symbol slot between an unoccupied sub-symbol slot and the beginning of a symbol. The method, at 620, may comprise detecting at least one of a scheduling policy and an occupancy time, based on the received reservation signal.

Figure 7:
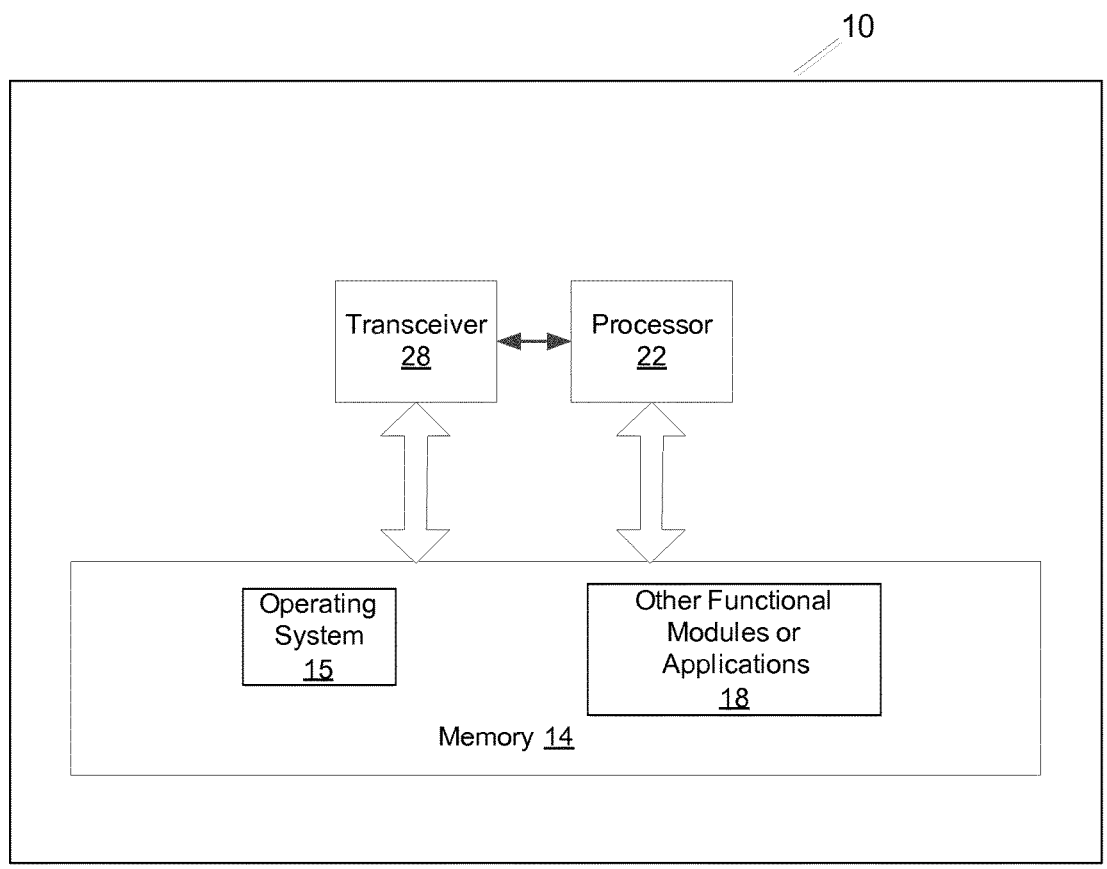
FIG. 7 illustrates an apparatus in accordance with embodiments of the invention.

FIG. 7 illustrates an apparatus in accordance with embodiments of the invention. In one embodiment, the apparatus can be a base station and/or an evolved Node B. The apparatus may also be a user equipment. Apparatus 10 can comprise a processor 22 for processing information and executing instructions or operations. Processor 22 can be any type of general or specific purpose processor. While a single processor 22 is shown in FIG. 7, multiple processors can be utilized according to other embodiments. Processor 22 can also comprise one or more of general-purpose computers, special purpose computers, microprocessors, digital signal processors (DSPs), field-programmable gate arrays (FPGAs), application-specific integrated circuits (ASICs), and processors based on a multi-core processor architecture, as examples.

Apparatus 10 can further comprise a memory 14, coupled to processor 22, for storing information and instructions that can be executed by processor 22. Memory 14 can be one or more memories and of any type suitable to the local application environment, and can be implemented using any suitable volatile or nonvolatile data storage technology such as a semiconductor-based memory device, a magnetic memory device and system, an optical memory device and system, fixed memory, and removable memory. For example, memory 14 comprises any combination of random access memory (RAM), read only memory (ROM), static storage such as a magnetic or optical disk, or any other type of non-transitory machine or computer readable media. The instructions stored in memory 14 can comprise program instructions or computer program code that, when executed by processor 22, enable the apparatus 10 to perform tasks as described herein.

Apparatus 10 can also comprise one or more antennas (not shown) for transmitting and receiving signals and/or data to and from apparatus 10. Apparatus 10 can further comprise a transceiver 28 that modulates information on to a carrier waveform for transmission by the antenna(s) and demodulates information received via the antenna(s) for further processing by other elements of apparatus 10. In other embodiments, transceiver 28 can be capable of transmitting and receiving signals or data directly.

Processor 22 can perform functions associated with the operation of apparatus 10 including, without limitation, precoding of antenna gain/phase parameters, encoding and decoding of individual bits forming a communication message, formatting of information, and overall control of the apparatus 10, including processes related to management of communication resources.

In an embodiment, memory 14 can store software modules that provide functionality when executed by processor 22. The modules can comprise an operating system 15 that provides operating system functionality for apparatus 10. The memory can also store one or more functional modules 18, such as an application or program, to provide additional functionality for apparatus 10. The components of apparatus 10 can be implemented in hardware, or as any suitable combination of hardware and software.

Figure 8:
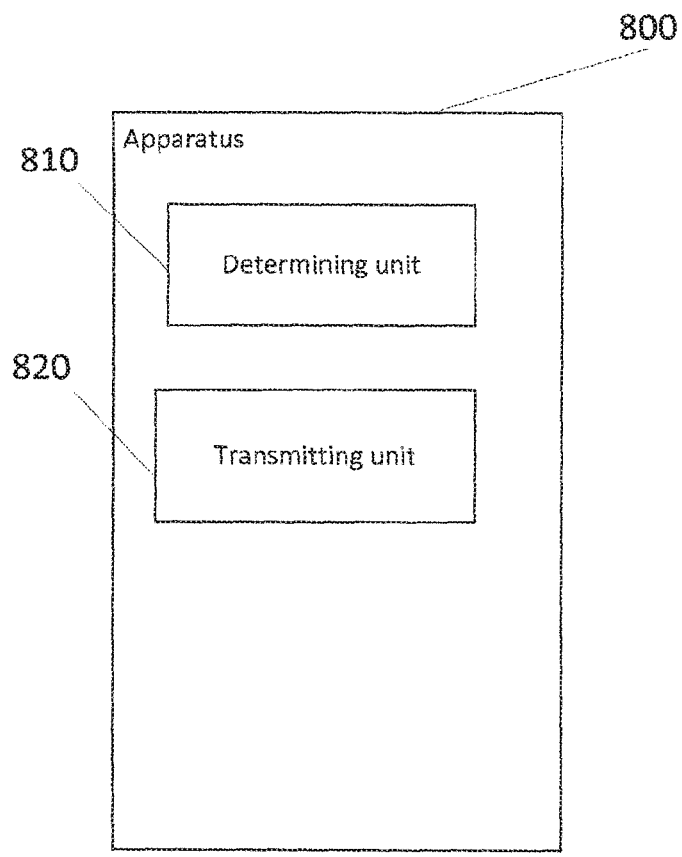
FIG. 8 illustrates another apparatus in accordance with embodiments of the invention.

FIG. 8 illustrates an apparatus in accordance with embodiments of the invention. Apparatus 800 can be a network element/entity such as a base station, an evolved Node B, an access point, and/or a user equipment, for example. Apparatus 800 can comprise a determining unit 810 that determines that a sub-symbol slot is an unoccupied sub-symbol slot. The unoccupied sub-symbol slot may correspond to an unoccupied operating channel. The unoccupied sub-symbol slot may be located within the duration of a first symbol. Apparatus 800 may also comprise a transmitting unit 820 that transmits a reservation signal in at least one sub-symbol slot between the unoccupied sub-symbol slot and the beginning of a second symbol. The number of sub-symbol slots within the duration of the first symbol may be larger than one.

Figure 9:
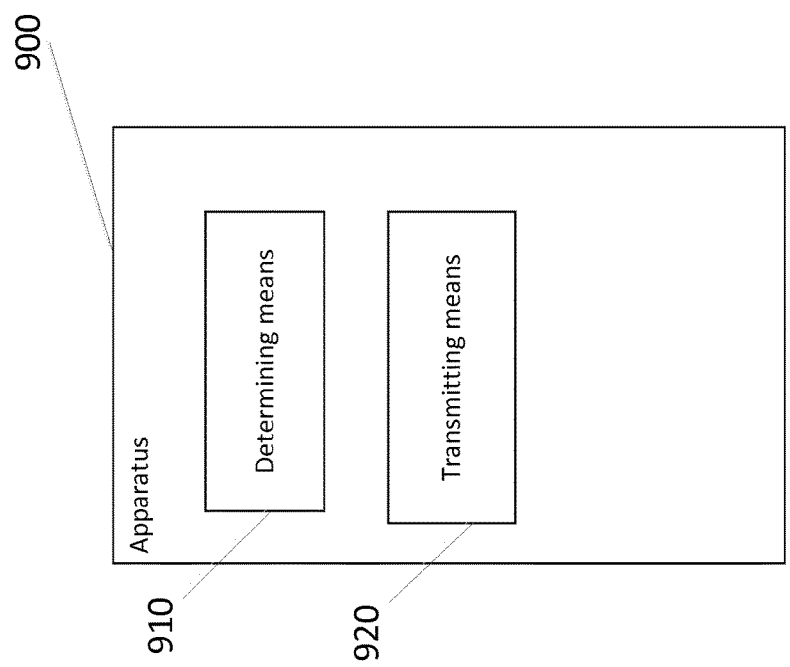
FIG. 9 illustrates another apparatus in accordance with embodiments of the invention.

FIG. 9 illustrates an apparatus in accordance with embodiments of the invention. Apparatus 900 can be a network element/entity such as a base station, an evolved Node B, an access point, and/or a user equipment, for example. Apparatus 900 can comprise a determining means 910 that determines that a sub-symbol slot is an unoccupied sub-symbol slot. The unoccupied sub-symbol slot may correspond to an unoccupied operating channel. The unoccupied sub-symbol slot may be located within the duration of a first symbol. Apparatus 900 may also comprise a transmitting means 920 that transmits a reservation signal in at least one sub-symbol slot between the unoccupied sub-symbol slot and the beginning of a second symbol. The number of sub-symbol slots within the duration of the first symbol may be larger than one.

Figure 10:
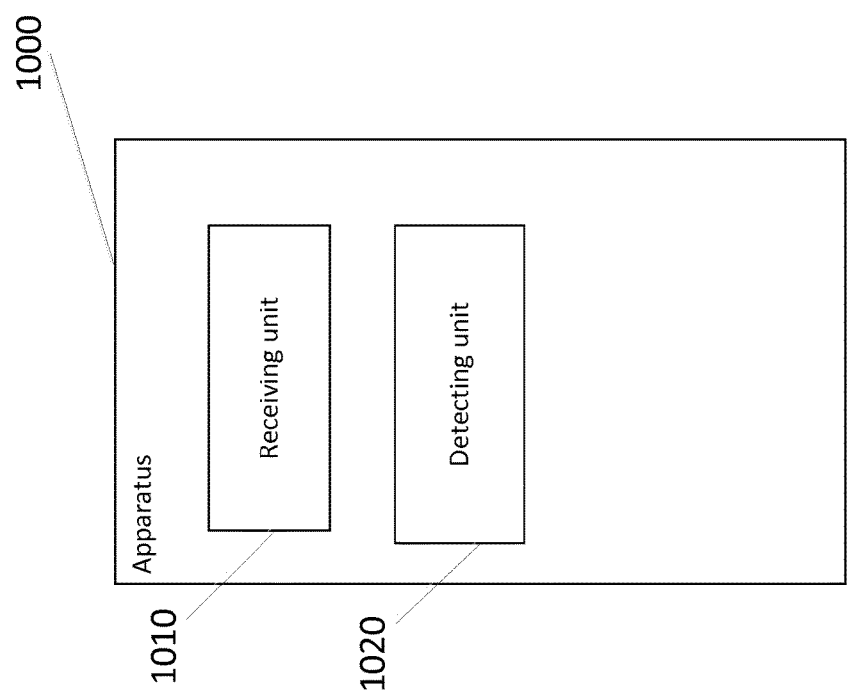
FIG. 10 illustrates another apparatus in accordance with embodiments of the invention.

FIG. 10 illustrates another apparatus in accordance with embodiments of the invention. Apparatus 1000 can be a network element/entity such as a base station, an evolved Node B, an access point, and/or a user equipment, for example. Apparatus 1000 can comprise a receiving unit 1010 that receives a reservation signal. The reservation signal may be in at least one sub-symbol slot between an unoccupied sub-symbol slot and the beginning of a symbol. Apparatus 1000 may also comprise a detecting unit 1020 that detects at least one of a scheduling policy and an occupancy time, based on the received reservation signal.

Figure 11:
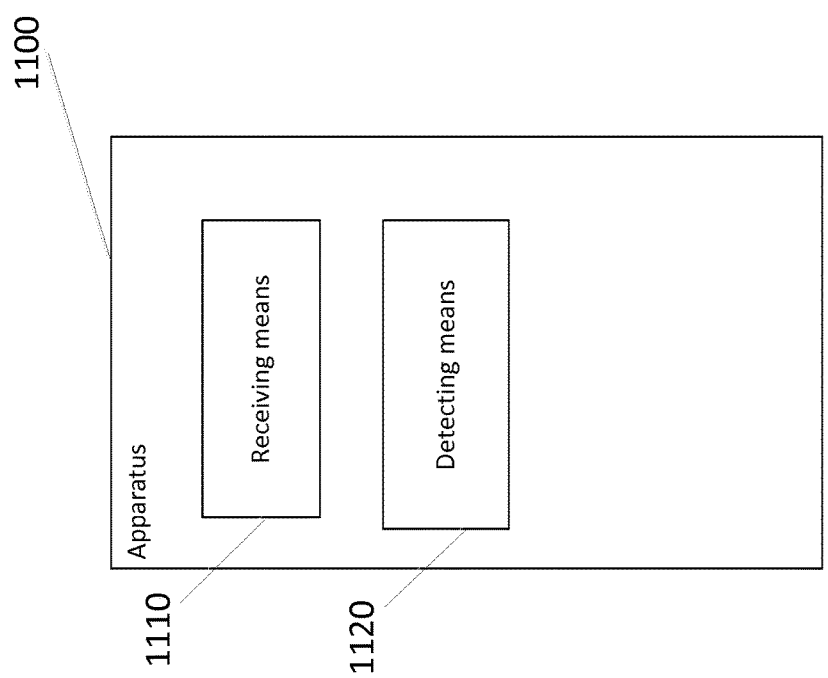
FIG. 11 illustrates another apparatus in accordance with embodiments of the invention.

FIG. 11 illustrates an apparatus in accordance with embodiments of the invention. Apparatus 1100 can be a network element/entity such as a base station, an evolved Node B, an access point, and/or a user equipment, for example. Apparatus 1100 can comprise a receiving means 1110 that receives a reservation signal. The reservation signal may be in at least one sub-symbol slot between an unoccupied sub-symbol slot and the beginning of a symbol. Apparatus 1100 may also comprise a detecting means 1120 that detects at least one of a scheduling policy and an occupancy time, based on the received reservation signal.

Figure 12:
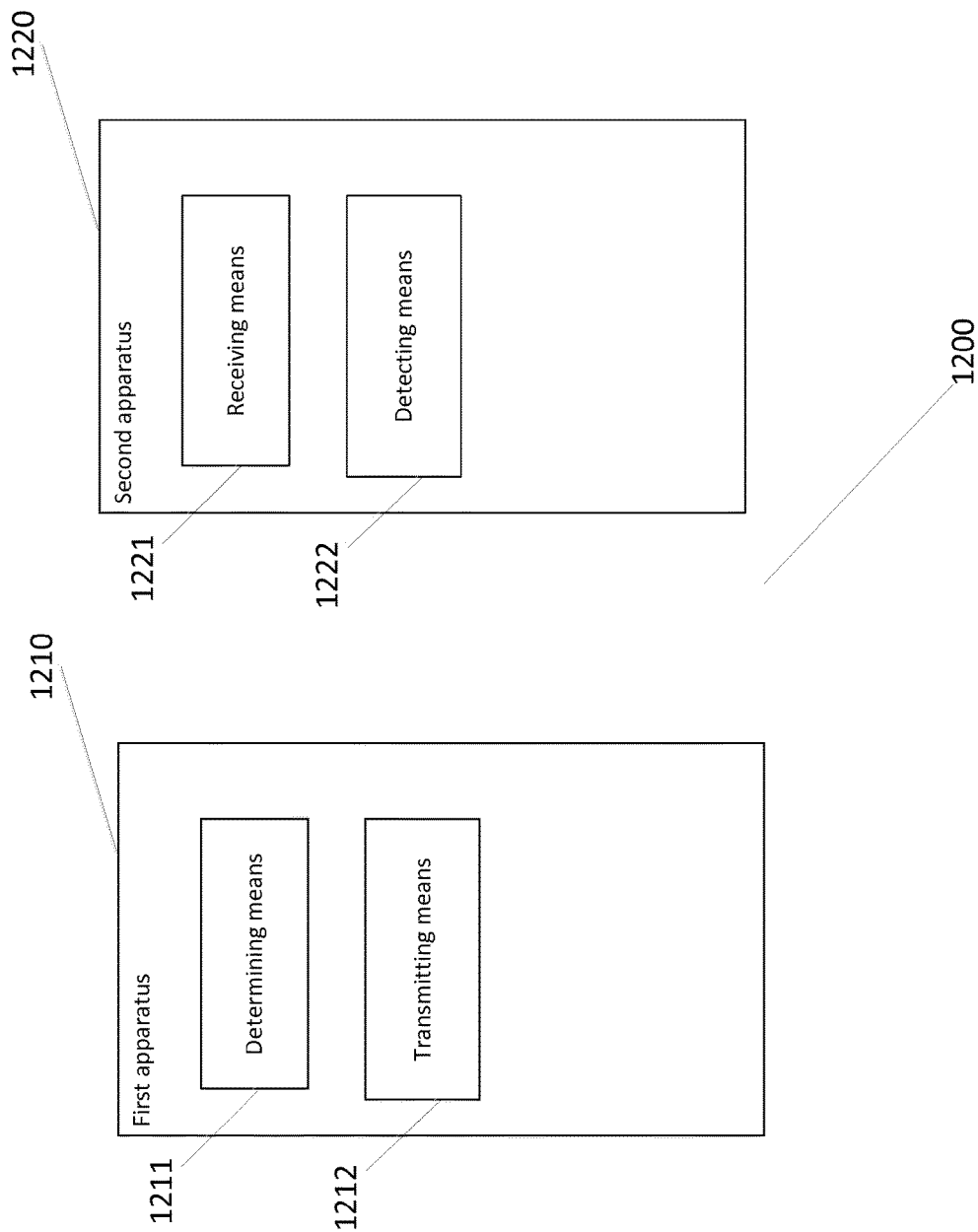
FIG. 12 illustrates a system in accordance with embodiments of the invention.

FIG. 12 illustrates a system in accordance with embodiments of the invention. System 1200 may comprise a first apparatus 1210. First apparatus 1210 may comprise a determining means 1211 that determines that a sub-symbol slot is an unoccupied sub-symbol slot. The unoccupied sub-symbol slot may correspond to an unoccupied operating channel. The unoccupied sub-symbol slot may be located within the duration of a first symbol. First apparatus 1210 may also comprise transmitting means 1212 that transmits a reservation signal in at least one sub-symbol slot between the unoccupied sub-symbol slot and the beginning of a second symbol. The number of sub-symbol slots within the duration of the first symbol may be larger than one. System 1200 may also comprise a second apparatus 1220. Second apparatus 1220 may comprise a receiving means 1221 that receives the reservation signal. Second apparatus 1220 may also comprise detecting means 1222 that detects at least one of a scheduling policy and an occupancy time, based on the received reservation signal.

The described features, advantages, and characteristics of the invention can be combined in any suitable manner in one or more embodiments. One skilled in the relevant art will recognize that the invention can be practiced without one or more of the specific features or advantages of a particular embodiment. In other instances, additional features and advantages can be recognized in certain embodiments that may not be present in all embodiments of the invention. One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention.

We claim:

1. An apparatus, comprising:
    at least one processor and at least one memory including computer program code,
    the at least one memory and the computer program code are configured, with the at least one processor, to cause the apparatus at least to
    determine that a sub-symbol slot is an unoccupied sub-symbol slot, wherein the unoccupied sub-symbol slot corresponds to an unoccupied operating channel, and the unoccupied sub-symbol slot is located within the duration of a first symbol; and
    transmit a reservation signal in at least one sub-symbol slot between the unoccupied sub-symbol slot and the beginning of a second symbol, wherein the number of sub-symbol slots within the duration of the first symbol is larger than one, and wherein the reservation signal is transmitted until a start of transmission of payload data, payload data transmissions begin only at predefined times, and the predefined times are at least one of starting times of predetermined symbols, starting times of the next symbols, and starting times of the next subframes.

2. The apparatus according to claim 1, wherein the sub-symbol slots comprise clear-channel-assessment slots.

3. The apparatus according to claim 1, wherein the first symbol comprises either an orthogonal-frequency-division-multiplexing symbol with a cyclic prefix/postfix or a single-carrier frequency-division-multiple-access symbol with a cyclic prefix/postfix.

4. The apparatus according to claim 1, wherein, with the exception of a first sub-symbol slot, the sub-symbol slots have equal lengths.

5. The apparatus according to claim 1, wherein the apparatus comprises a user equipment or a base station.

6. The apparatus according to claim 1, wherein the reservation signal comprises at least a sequence.

7. The apparatus according to claim 6, wherein the sequence is at least one of a constant-amplitude-zero-auto-correlation sequence and a Zadoff-Chu sequence.

8. The apparatus according to claim 6, wherein the sequence is determined based on at least one of a Public-Land-Mobile-Network identifier and a physical cell identity.

9. The apparatus according to claim 1, wherein the reservation signal is mapped to every Nth subcarrier, and N corresponds to a configured or a predetermined number.

10. The apparatus according to claim 1, wherein the reservation signal is mapped to every Nth subcarrier, and N corresponds to the number of sub-symbol slots within the duration of the first symbol.

11. The apparatus according to claim 1, wherein the at least one memory and the computer program code are configured, with the at least one processor, to cause the apparatus further to
    determine subcarrier indexes based on at least one of a Public-Land-Mobile-Network identifier and a physical cell identity.

12. The apparatus according to claim 1, wherein the reservation signal has a duration of a sub-symbol slot, and the reservation signal is repeated in a plurality of sub-symbol slots until the beginning of the second symbol.

13. The apparatus according to claim 1, wherein the reservation signal is not transmitted in a first sub-symbol slot within the symbol.

14. The apparatus according to claim 1, wherein each sub-symbol slot is long enough to accommodate a clear-channel assessment.

15. The apparatus according to claim 1, wherein the reservation signal carries at least one of a physical cell identity and a Public-Land-Mobile-Network identifier.

16. A method, comprising:
    determining, by a network element, that a sub-symbol slot is an unoccupied sub-symbol slot, wherein the unoccupied sub-symbol slot corresponds to an unoccupied operating channel, and the unoccupied sub-symbol slot is located within the duration of a first symbol; and
    transmitting a reservation signal in at least one sub-symbol slot between the unoccupied sub-symbol slot and the beginning of a second symbol, wherein the number of sub-symbol slots within the duration of the first symbol is larger than one, and wherein the transmitting a reservation signal comprises transmitting the reservation signal until a start of transmission of payload data, payload data transmissions begin only at predefined times, and the predefined times are at least one of starting times of predetermined symbols, starting times of the next symbols, and starting times of the next subframes.

17. The method according to claim 16, wherein the first symbol comprises either an orthogonal-frequency-division-multiplexing symbol with a cyclic prefix/postfix or a single-carrier frequency-division-multiple-access symbol with a cyclic prefix/postfix.

18. An apparatus, comprising:
at least one processor and at least one memory including computer program code,
the at least one memory and the computer program code are configured, with the at least one processor, to cause the apparatus at least to
receive a reservation signal, wherein the reservation signal is in at least one sub-symbol slot of a first symbol between an unoccupied sub-symbol slot of the first symbol and beginning of a second symbol, and wherein the reservation signal is received until a start of reception of payload data, payload data receptions begin only at predefined times, and the predefined times are at least one of starting times of predetermined symbols, starting times of the next symbols, and starting times of the next subframes.

19. The apparatus according to claim 18, wherein the first symbol comprises either an orthogonal-frequency-division-multiplexing symbol with a cyclic prefix/postfix or a single-carrier frequency-division-multiple-access symbol with a cyclic prefix/postfix.

* * * * *